United States Patent
Turner et al.

(10) Patent No.: US 7,124,865 B2
(45) Date of Patent: Oct. 24, 2006

(54) PRESSURE REGULATING DAMPERS

(75) Inventors: Roy A. Turner, Victorville, CA (US); John B. Cassidy, Hesperia, CA (US)

(73) Assignee: Progressive Suspension, Inc., Hesperia, CA (US)

( * ) Notice: Subject to any disclaimer, the term of this patent is extended or adjusted under 35 U.S.C. 154(b) by 0 days.

(21) Appl. No.: 10/778,975

(22) Filed: Feb. 13, 2004

(65) Prior Publication Data

US 2005/0178626 A1    Aug. 18, 2005

(51) Int. Cl.
    F16F 9/54    (2006.01)
(52) U.S. Cl. .................. 188/322.2; 188/314; 188/318; 267/64.28
(58) Field of Classification Search ............. 188/322.2, 188/322.19, 269, 304, 299.1, 318, 314, 321.11, 188/297; 267/218, 64.28, 64.15
    See application file for complete search history.

(56) References Cited

U.S. PATENT DOCUMENTS

| | | | |
|---|---|---|---|
| 1,164,371 A | 12/1915 | Lovejoy | |
| 3,865,356 A | 2/1975 | Wossner | |
| 4,271,938 A | 6/1981 | Berger | |
| 4,407,396 A | 10/1983 | Sirven | |
| 4,515,253 A * | 5/1985 | Itoh | 188/314 |
| 4,546,959 A * | 10/1985 | Tanno | 267/64.15 |
| 4,616,810 A * | 10/1986 | Richardson et al. | 267/218 |
| 4,645,043 A | 2/1987 | Imaizumi | |
| 4,645,044 A | 2/1987 | Kato et al. | |
| 4,749,068 A | 6/1988 | Sirven | |
| 4,858,898 A * | 8/1989 | Niikura et al. | 267/218 |
| 4,972,928 A | 11/1990 | Sirven | |
| 5,064,032 A | 11/1991 | Ashiba | |
| 5,190,126 A | 3/1993 | Curnutt | |
| 5,207,300 A | 5/1993 | Engel et al. | |
| 5,226,512 A | 7/1993 | Kanari | |
| 5,400,880 A | 3/1995 | Ryan | |
| 5,505,281 A | 4/1996 | Lee | |
| 5,533,586 A | 7/1996 | Thompson | |
| 5,533,596 A | 7/1996 | Patzenhauer et al. | |
| 5,664,649 A | 9/1997 | Thompson et al. | |
| 5,927,449 A | 7/1999 | Huang et al. | |
| 5,957,252 A | 9/1999 | Berthold | |
| 6,086,060 A | 7/2000 | Berthold | |
| 6,220,409 B1 | 4/2001 | Deferme | |
| 6,254,067 B1 | 7/2001 | Yih | |
| 6,264,015 B1 | 7/2001 | DeKock | |
| 6,286,642 B1 | 9/2001 | Yi | |
| 6,305,512 B1 | 10/2001 | Heinz et al. | |
| 6,340,153 B1 | 1/2002 | Miesner | |
| 6,390,457 B1 | 5/2002 | Roper | |

(Continued)

Primary Examiner—James McClellan
Assistant Examiner—Mariano Sy
(74) Attorney, Agent, or Firm—Workman Nydegger

(57) ABSTRACT

A damper includes housing bounding a chamber. A barrier is movably disposed within the chamber so as to divide at least a portion of the chamber into a pressure compartment and a control compartment each having a volume, the volume of the pressure compartment and the control compartment each being adjustable based on movement of the barrier. A first compressible gas is disposed within the pressure compartment while a first hydraulic fluid is disposed within the control compartment A piston shaft has a first end slidably disposed within the control compartment. A temperature compensator disposed within the chamber automatically adjusts the combined volume of the pressure compartment and the control compartment based on the temperature of the first hydraulic fluid within the control compartment so as to regulate the pressure within the control compartment.

31 Claims, 11 Drawing Sheets

U.S. PATENT DOCUMENTS 6,450,304 B1    9/2002   Miller et al.
6,880,684 B1 *  4/2005   Evans et al. ............. 188/319.2

2004/0020730 A1    2/2004   Turner
2004/0145099 A1 *  7/2004   Kojima .................... 267/64.15

* cited by examiner

PRESSURE REGULATING DAMPERS

CROSS-REFERENCE TO RELATED APPLICATIONS

Not applicable.

BACKGROUND OF THE INVENTION

1. The Field of the Invention

The present invention relates to hydraulic dampers and, more specifically, hydraulic dampers wherein the pressure within the hydraulic dampers is automatically regulated as the temperature of the dampers varies.

2. The Relevant Technology

Dampers are used in conventional shock absorbers, front forks, and other suspension systems to dampen or absorb an impact or force applied to the suspension system. For example, a conventional damper includes a tubular housing bounding a sealed chamber. The chamber is divided by a floating piston into a primary chamber and a secondary chamber. An incompressible hydraulic fluid is disposed within the primary chamber while a compressible gas is disposed within the secondary chamber. One end of a piston rod having a piston mounted thereon is also disposed within the primary chamber. Orifices extend through the piston so that the piston can slide within the primary chamber of the housing as the hydraulic fluid passes through the orifices.

When a compressive force is applied to the damper, such as when an automobile having shock absorbers hits a bump, the force seeks to drive the piston rod into the primary chamber of the housing. The damper partially absorbs this force by using the force to compress the hydraulic fluid through orifices. When a rebound force is applied to the damper, such as through the application of a spring, the damper again regulates the rebound force by requiring the hydraulic fluid to pass back through the orifices in the piston in order for the piston rod to return to its original position.

Although conventional dampers impart some degree of damping to suspension systems, conventional dampers have significant shortcomings. For example, during extended use, the hydraulic fluid is heated due to the hydraulic fluid being repeatedly forced through the orifices in the piston. As the hydraulic fluid is heated, the hydraulic fluid expands in the primary chamber of the damper so as to move the floating piston and compress the gas within the secondary chamber. In turn, compressing the gas increasing the gas pressure that is applied through the floating piston on the hydraulic fluid and the piston rod. Furthermore, heat from the hydraulic fluid is transferred through the housing and floating piston so as to heat the gas within the secondary chamber. Heating of the gas further increases the gas pressure and thus the force applied against the hydraulic fluid and the piston rod.

As a result of the increased force applied against the piston rod within the primary chamber, a greater external force must be applied to the piston rod to advance the piston rod into the chamber of the damper. Accordingly, for dampers used in an automobile, motorcycle or other forms of vehicle suspension systems, the ride of the vehicle becomes increasingly stiff as the temperature of the hydraulic fluid and gas within the damper increases.

To provide optimal damping in a suspension system, it is generally desirable that the piston rod force and damping properties of a damper be independent and unaffected by change in temperature of the hydraulic fluid and compressible gas contained within the damper. As such, what is needed in the art are dampers that automatically regulate the pressure on the hydraulic fluid within the dampers as the hydraulic fluid changes in temperature.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
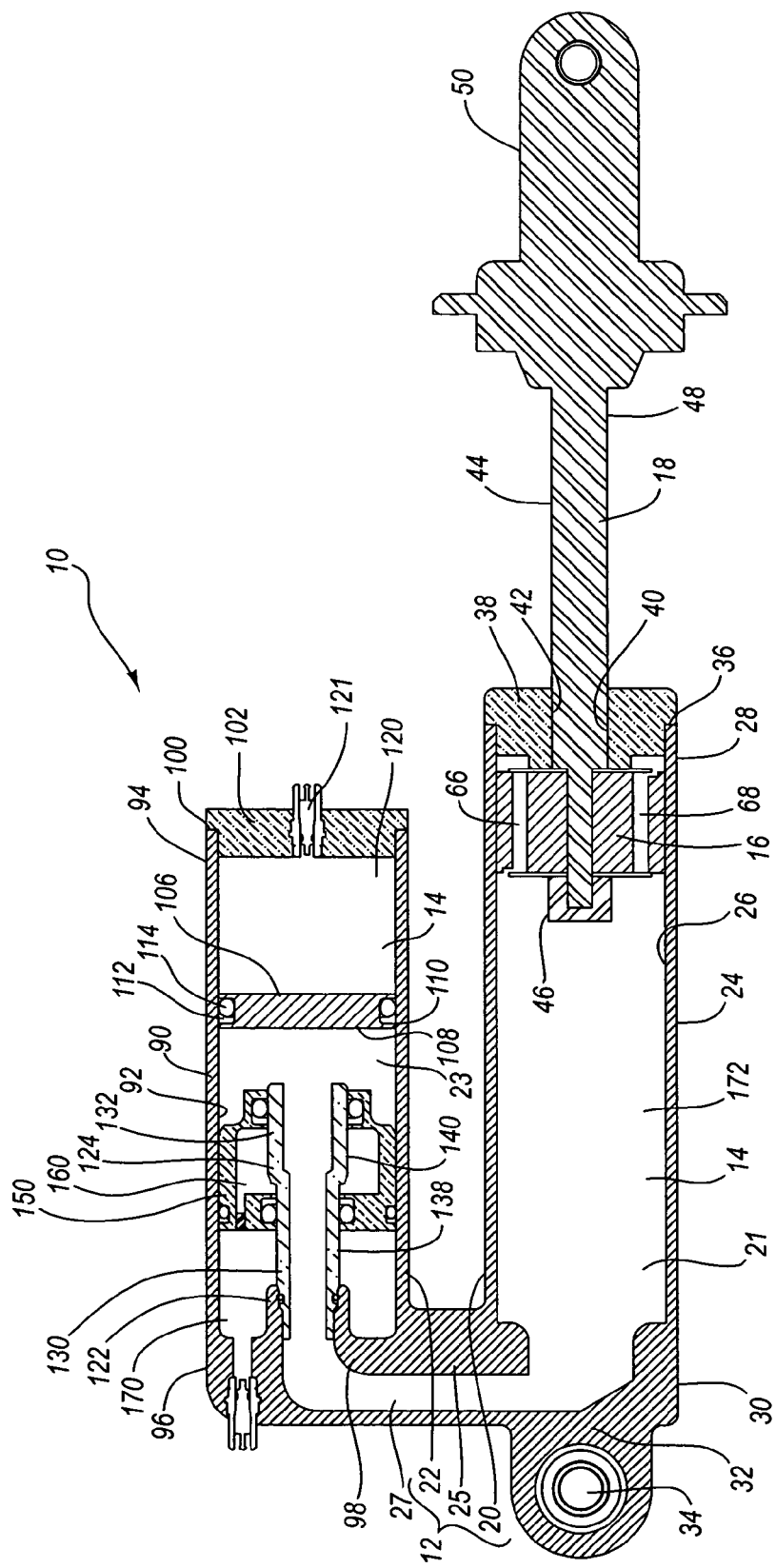
FIG. 1 is a cross sectional side view of one embodiment of a damper in a cold state with a piston rod in a retracted position.

Depicted in FIG. 1 is one embodiment of a damper 10 incorporating features of the present invention. In general damper 10 comprises a housing 12 bounding a chamber 14. A piston 16 is movably disposed within chamber 14. Piston 16 is mounted on a piston rod 18 such that movement of piston rod 18 moves piston 16 within chamber 14.

As will be discussed below in greater detail, housing 12 can have a variety of different configurations and sizes. In the embodiment depicted in FIG. 1, housing 12 has a piggy-back configuration. Specifically, housing 12 comprises a primary housing 20 which bounds a primary chamber 21, a secondary housing 22 which bounds a secondary chamber 23, and a transition housing 25 which at least partially bounds a transfer channel 27. Secondary housing 22 is disposed adjacent to primary housing 20 in substantially parallel alignment therewith. Transition housing 25 extends between primary housing 20 and secondary housing 22 such that transition channel 27 provides fluid communication between primary chamber 21 and secondary chamber 23. Primary chamber 21, secondary chamber 23, and transition channel 27 combine to form chamber 14.

Primary housing 20 comprises an elongated tubular sidewall 24 having an interior surface 26 extending between a first end 28 and an opposing second end 30. Disposed as second end 30 is an end wall 32 having a mounting hole 34 formed thereat. First end 28 of sidewall 24 terminate at an opening 36. A cap 38 is mounted on first end 28 of sidewall 24 so as to cover opening 36. Cap 38 has an interior surface 40 which bounds a passageway 42 extending through cap 38 so as to communicate with primary chamber 21.

Figure 2:
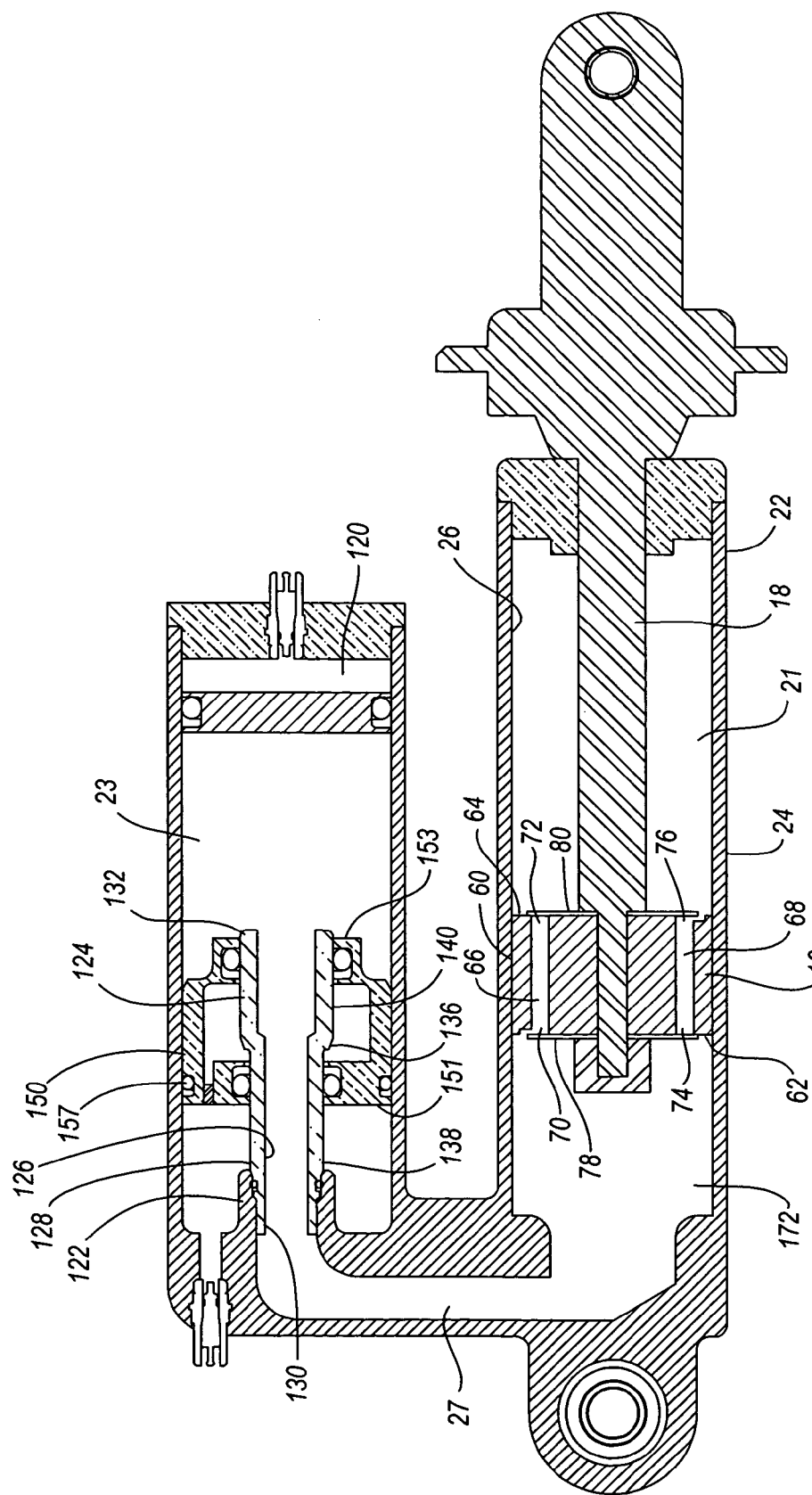
FIG. 2 is a cross sectional side view of the damper shown in FIG. 1 in a cold state with the piston rod in a compressed position.

Piston rod 18 is slidably disposed within passageway 42. Specifically, piston rod 18 has an exterior surface 44 that extends between a first end 46 and an opposing second end 48. A mounting bracket 50 is secured on second end 48 of piston rod 18. First end 46 of piston rod 18 is disposed within primary chamber 21. Piston 16 is mounted on first end 46 of piston rod 18 so as to move concurrently with piston rod 18. For example, piston rod 18 slides within passageway 42 so that both piston rod 18 and piston 16 can selectively move relative to housing 14 at any location between a retracted position as shown in FIG. 1 and a compressed position as shown in FIG. 2. It is appreciated that any number of seals, gasket, 0-rings, and the like can be mounted on cap 38 so as to provide a continued sealed engagement between cap 38 and piston rod 18 as piston rod 18 repeatedly moves between the retracted position and the compressed position.

As will be discussed below in greater detail, disposed within primary chamber 21 is a hydraulic fluid. As used in the specification and appended claims, the term "hydraulic fluid" is intended to include all types of fluids that can be used to transfer hydraulic pressures. Examples of hydraulic fluids include petroleum based hydraulic fluids provided by Shell, petroleum/synthetic blend hydraulic fluid provided by Putoline, and full synthetic hydraulic fluids provided by Redline. Although hydraulic fluids are generally considered as being non-compressible, it is appreciated that hydraulic fluids can be emulsified or have entrained gas, thereby making them slightly compressible.

As depicted in FIG. 2, piston 16 has an annular side surface 60 that extends between a first end face 62 and an opposing second end face 64. In one embodiment side surface 60 is movably sealed against sidewall 24 by being biased thereagainst. In other embodiments, one or more o-rings, gaskets, or other seals is disposed between side surface 60 of piston 16 and interior surface 26 of sidewall 24 so that piston 16 has a continued sealed engagement with interior surface 26 as piston 16 repeatedly moves between the retracted position and the compressed position.

Extending through piston 16 between first end face 62 and second end face 64 is at least one pressure port 66 and at least one rebound port 68. Pressure port 66 has a first opening 70 formed on first end face 62 of piston 16 and a second opening 72 formed on second end face 64 of piston 16. Similarly, rebound port 68 has a first opening 74 on first end face 62 of piston 16 and a second opening 76 on second end face 64 of piston 16. A flexible metal spring shim 78 encircles piston rod 18 so as to bias against first end face 62 of piston 16 while a flexible metal shim 80 encircles piston rod 18 so as to bias against second end face 64 of piston 16.

When piston 16 is stationary, shim 78 extends over first opening 74 of rebound port 68 while allowing open fluid communication between primary chamber 21 and first opening 70 of pressure port 66. In contrast, when piston 16 is stationary shim 80 extends over second opening 72 of pressure port 66 while allowing fluid communication between chamber 14 and second opening 76 of rebound port 68. During operation, shims 78 and 80 each function as a one-way check valve. Specifically, to enable piston 16 to move from the retracted position in FIG. 1 to the compressed position in FIG. 2, the hydraulic fluid within primary chamber 21 has to pass through piston 16. Because rebound port 68 is closed by shim 78 at first end face 62, the hydraulic fluid can only pass through pressure port 66 as piston 16 moves toward the compressed position.

Prior to movement of piston 16, shim 80 must be flexed so that the hydraulic fluid can pass through second opening 72 of pressure port 66. When a compression force is applied to piston rod 18 in the direction of moving piston 16 into the compressed position, a corresponding force is applied by the hydraulic fluid within the pressure port 66 against shim 80. If the force applied by the hydraulic fluid is sufficient to backwardly flex shim 80, the hydraulic fluid is free to pass through pressure port 66 enabling piston 16 to move within primary chamber 21 toward the compressed position. Piston 16 continues to move until the compression force applied to piston rod 18 decreases to the extent that the hydraulic fluid within pressure port 66 can no longer flex shim 80.

Similarly, when a retraction force is applied to piston rod 18 in the direction of moving piston 16 from the compressed position to the retracted position, the hydraulic fluid is forced to travel through rebound port 68. Again, if the corresponding force applied by the hydraulic fluid within rebound port 68 to shim 78 is sufficient to backwardly flex shim 78, the hydraulic fluid is free to pass through rebound port 68 enabling piston 16 to move within primary chamber 21 toward the retracted position. In alternative embodiments, it is appreciated shims 78 and 80 can be replaced with a plurality of stacked shims which require a greater force before flexing. Furthermore, shims 78 and 80 can be replaced with one-way check valve configurations such as a solid washer or hinged flap that is spring biased against piston 16.

Forcing the hydraulic fluid to flex shims 78 and 80 and pass through the constricted passages of pressure port 66 and rebound port 68 during movement of piston rod 18 results in damping of the applied compression force and retraction force. In alternative embodiments, it is appreciated that piston 16 and/or piston rod 18 can have a variety of alternative configurations including those which enable automatic and/or adjustable control of the damping properties. By way of example and not by limitation, some alternatives are disclosed in U.S. patent application Ser. No. 10/449,722 filed May 29, 2003 in the name of Roy A. Turner which application is incorporated herein by specific reference.

Returning to FIG. 1, secondary housing 22 comprises a tubular sidewall 90 having an interior surface 92 extending between a first end 94 and an opposing second end 96. Second end 96 terminates at an end wall 98 while first end 94 terminates at an opening 100. A cap 102 is secured to first end 94 of sidewall 90 so as to cover and seal opening 100.

Moveably disposed within secondary housing 22 is a barrier 106. In the depicted embodiment, barrier 106 comprises a floating piston. Specifically, barrier 106 comprises a solid body 108 that extends to a perimeter edge 110. An annular groove 112 is formed along perimeter edge 110. An O-ring 114 is disposed within groove 112 so as to form a sealed engagement between body 108 and interior surface 92 of sidewall 90 as body 108 is moved within secondary housing 22. That is, barrier 106 can selectively move longitudinally within secondary housing 22 under applied pressures while at least substantially preventing the transfer of liquids or gases between opposing sides of barrier 106.

The portion of chamber 14 disposed between barrier 106 and cap 102 is referred to as a pressure compartment 120. The size of pressure compartment 120 changes based on the position of barrier 106. Disposed within pressure compartment 120 is a compressible gas. By way of example and not by limitation, the compressible gas can comprise air, oxygen, nitrogen, helium or any other compressible gas or combination of gases. In one embodiment the gas is dehumidified. The compressible gas within pressure compartment 120 can be held at any desired pressure. For example, in one embodiment when piston 16 is in the retracted position, the compressible gas in pressure compartment 120 is typically at a pressure greater than about 50 psi (35 N/M$^2$), more commonly greater than about 100 psi (70 N/m$^2$), and more commonly greater than about 150 psi (105 N/m$^2$). Other pressures can also be used. As will be discussed below in greater detail, the pressure within pressure compartment 120 changes as piston 16 moves between the retracted position and the extended position.

In one embodiment of the present invention, means are provided for putting a gas into or withdrawing a gas from pressure compartment 120. By way of example and not by limitation, a gas valve 121 is mounted on cap 102 so as to communicate with pressure compartment 120. In one embodiment, gas valve 121 comprises a Schrader charge valve. Any other conventional gas valves can also be used.

As previously discussed, transition channel 27 provides fluid communication between primary chamber 21 and secondary chamber 22. Transition channel 27 terminates at an annular lip 122 which projects from end wall 98 of secondary housing 22. As depicted in FIG. 2, secured to annular lip 122 is a tubular stem 124. Stem 124 has an interior surface 126 and an exterior surface 128 that each extend between a first end 130 and an opposing second end 132. First end 130 of stem 124 is secured in seal engagement with annular lip 122. Interior surface 126 bounds a passageway 134 that is in fluid communication transition channel 27 and projects into secondary chamber 23.

Exterior surface 128 of stem 124 comprises an annular, radially outwardly projecting shoulder 136, a annular first portion 138 extending between first end 130 and shoulder 136, and an annular second portion 140 extending between shoulder 136 and second end 132. Second portion 140 has an outer diameter larger than the outer diameter of first portion 138.

Figure 3:
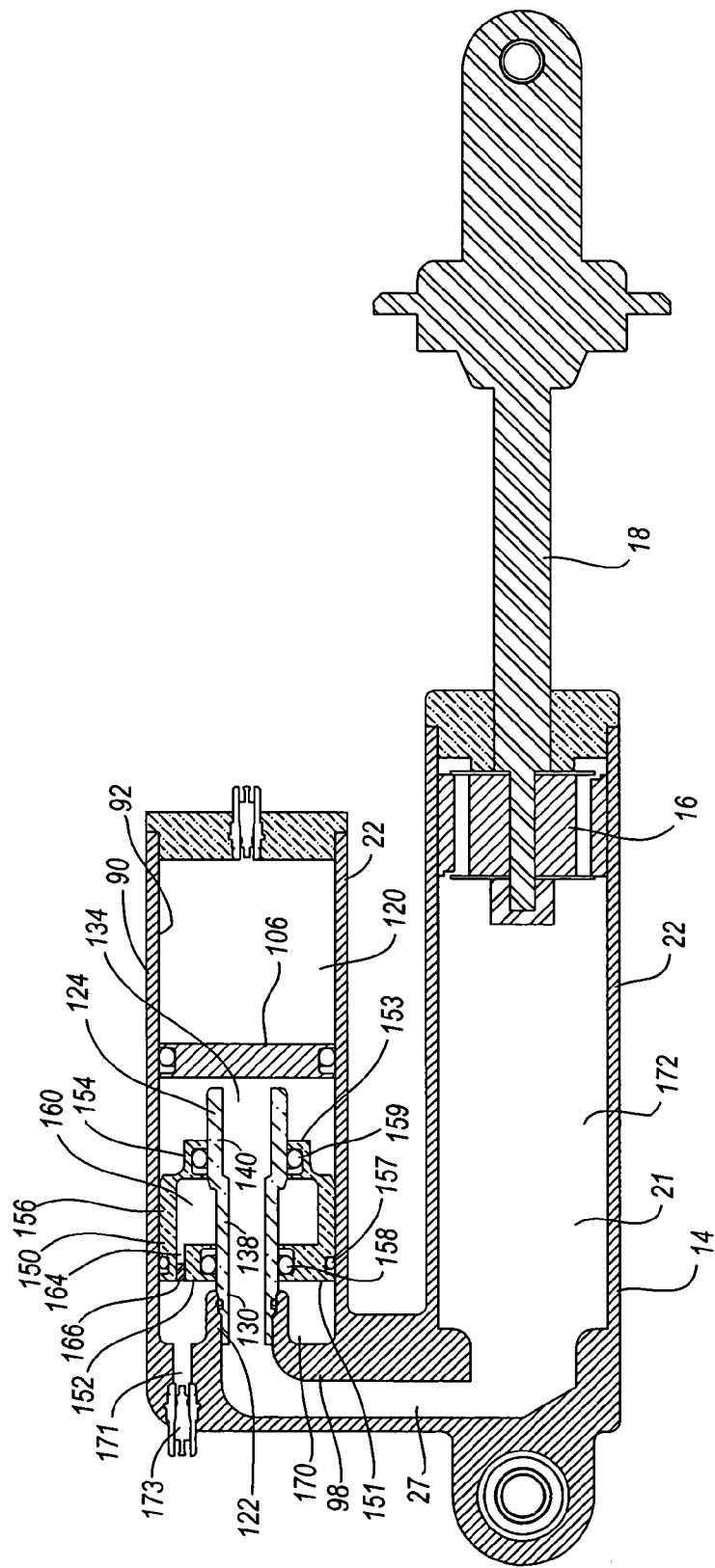
FIG. 3 is a cross sectional side view of the damper shown in FIG. 1 in a heated state with the piston rod in the retracted position.

Radially encircling stem 124 is a temperature compensator 150 having a first end face 151 and an opposing second end face 153. As depicted in FIGS. 2 and 3, temperature compensator 150 has a substantially U-shaped transverse cross section which includes an annular first leg 152, a spaced apart annular second leg 154, and an annular back 156 extending therebetween. An annular seal 157 is mounted on back 156 so as to provide sealed engagement between back 156 and interior surface 92 of secondary housing 22. An annular seal 158 is mounted on first leg 152 so as to provide sealed engagement between first leg 152 and first portion 138 of the exterior surface of stem 124. Similarly, an annular seal 159 is mounted on second leg 154 so as to provide sealed engagement between second leg 154 and second portion 140 of the exterior surface of stem 124.

Bounded between temperature compensator 150 and stem 124 so as to encircle stem 124 is an annular regulating compartment 160. Regulating compartment 160 is filled with a hydraulic fluid and is sealed closed by seals 158 and 159. An overflow port 164 extends through first leg 152 and communicates with regulating compartment 160. Overflow port 164 is selectively sealed closed by a threaded plug 166. Overflow port 164 is used in filling regulating compartment 160 with the hydraulic fluid. For example, in one embodiment stem 124 and temperature compensator 150, with plug 166 removed, are submerged in hydraulic fluid. While submerged, temperature compensator 150 is slid over stem 124 so that the hydraulic fluid is captured within regulating compartment 160. Excess fluid is allowed to escape out through overflow port 164. Once temperature compensator 150 is appropriately positioned relative to stem 124, as shown in FIG. 1, plug 166 is inserted within overflow port 164. Stem 124 with temperature compensator 150 mounted thereon is then secured to annular lip 122.

Because shoulder 136 of stem 124 is disposed within regulating compartment 160, longitudinal movement of temperature compensator 150 along stem 124 changes the volume of regulating compartment 160. For example, under ambient conditions as depicted in FIG. 1, temperature compensator 150 is disposed at second end 132 of stem 124 so that a relatively long section of second portion 140 of stem 124 is disposed within regulating compartment 160. Because second portion 140 has a larger outer diameter than first portion 138, the volume of regulating compartment 160 is minimized in this position. As temperature compensator 150 slides toward first end 130 of stem 124 as shown in FIG. 3, regulating compartment 160 is bounded by more of first portion 138 and less of second portion 140. As a result, the volume of regulating compartment 160 increases as temperature compensator 150 slides toward first end 130 of stem 124.

As also depicted in FIG. 3, an annular resistance compartment 170 is disposed between end wall 98 of secondary housing 22 and first end face 151 of temperature compensator 150. Resistance compartment 170 is sealed closed by virtue of seal 157 extending between temperature compensator 150 and sidewall 90 and seal 158 extending between temperature compensator 150 and stem 124. In one embodiment of the present invention, resistance compartment 170 is filled with a compressible gas having a pressure greater than the maximum pressure of the compressible gas within pressure compartment 120.

In one embodiment of the present invention, means are provided for putting a gas into or withdrawing a gas from resistance compartment 170. By way of example and not by limitation, a passage 171 extends through secondary housing 22 so as to communicate with resistance compartment 170. A gas valve 173 is coupled with passage 171 so as to seal passage 171 but allow gas to be selectively put into or withdrawn from resistance compartment 170. Any type of gas valve can be used such as a Schrader charge valve.

Based on the above discussion, chamber 14 can be characterized as comprising pressure compartment 120 which is filled with a compressible gas, resistance compartment 170 which is filled with a compressible gas, regulating compartment 160 which is filled with a hydraulic fluid, and a control compartment 172 which is also filled with a hydraulic fluid. Control compartment 172 generally comprises primary chamber 21, transition channel 27, passageway 134 of stem 124, and the portion of secondary chamber 23 extending between barrier 106 and temperature compensator 150. The volume of each of compartments 120, 160, 170, and 172 is adjustable based on movement of barrier 106 and temperature compensator 150. For example, as temperature compensator 150 moves toward first end 130 of stem 124, the combined volume of pressure compartment 120 and control compartment 172 increases.

During operation, as piston rod 18 moves from the retracted position as shown in FIG. 1 to the compressed position shown in FIG. 2, more and more of piston rod 18 enters control compartment 172. That is, the combined volume of pressure compartment 120 and control compartment 172 is decreased because a portion of the combined volume is now occupied by a larger section of piston rod 18. As piston rod 18 enters control compartment 172 and displaces the hydraulic fluid, the hydraulic fluid pushes barrier 106 toward first end 94 of secondary housing 22, thereby compressing the gas within pressure compartment 120. As piston rod 18 moves back to the retracted position of FIG. 1, the combined volume of pressure compartment 120 and control compartment 172 increases, thereby allowing barrier 106 to move back to its original position and the gas in pressure compartment 120 to return to its original pressure.

As previously discussed, in one embodiment the gas pressure in resistance compartment 170 which acts against first end face 151 of temperature compensator 150 is set at a value that is greater than the maximum gas pressure experienced within pressure compartment 120. The gas pressure within pressure compartment 120 is applied to the hydraulic fluid within control compartment 172 through barrier 106 which is in turn applied against second end face 153 of temperature compensator 150. Accordingly, since the pressure on first end face 151 of temperature compensator 150 is greater than the pressure on second end face 153 of temperature compensator 150, temperature compensator 150 is not moved based on variations in pressure as piston rod 18 is moved between the retracted position and the compressed position.

However, repeated movement of piston 16 and piston rod 18 between the retracted and compressed positions causes the hydraulic fluid within control compartment 172 to be heated. In turn, heating of the hydraulic fluid causes the hydraulic fluid to expand within control compartment 172. Heat from the hydraulic fluid is also transferred through barrier 106 and secondary housing 22 so as to heat the gas within compression compartment 120. As discussed in the background section, in conventional damper designs, this heating of the hydraulic fluid and gas would increase the pressure within control compartment 172. This increase in pressure would make it more difficult to advance piston rod 18 into control compartment 172. Furthermore, the increased pressure would act as a rebound force which would drive piston rod 18 out of control compartment 172 with increased force. As a result, damping properties would be change based on the temperature of the hydraulic fluid. Accordingly, one embodiment of the present invention decreases, minimizes or eliminates this problem of variable damping based on the temperature of the hydraulic fluid.

Specifically, in the present embodiment the heat from the hydraulic fluid within control compartment 172 is also transferred through stem 124 and temperature compensator 150 so as to heat the hydraulic fluid within regulating compartment 160. Because the hydraulic fluid is non-compressible, as the hydraulic fluid within regulating compartment 160 is heated, the hydraulic fluid begins to expand. This expansion of the hydraulic fluid forces temperature compensator 150 to slide toward first end 96 of secondary housing 22 so as to increase the volume of regulating compartment 160.

Figure 4:
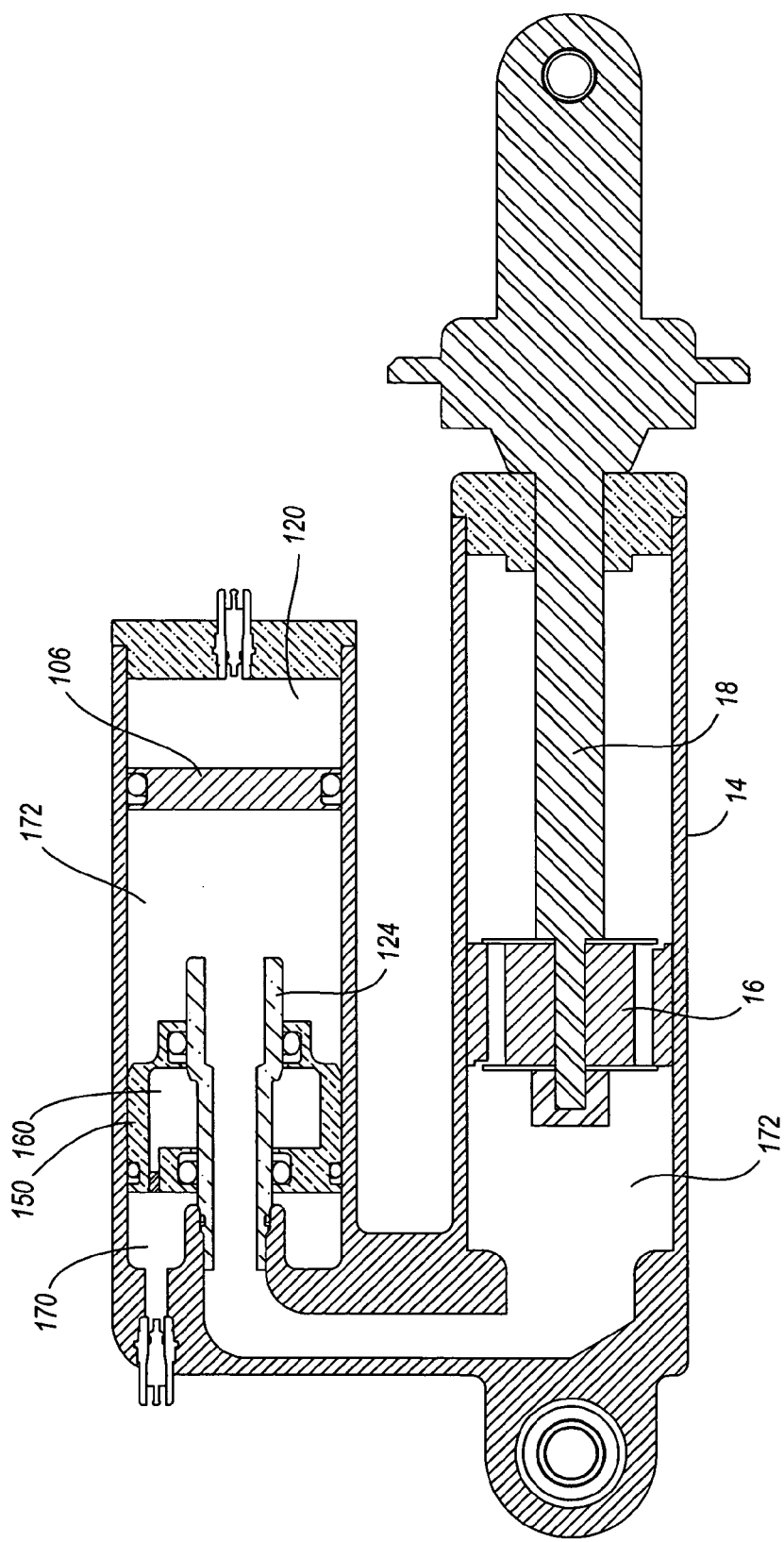
FIG. 4 is a cross sectional side view of the damper shown in FIG. 1 in a heated state with the piston rod in the compressed position.

In turn, movement of temperature compensator 150 increases the combined volume of pressure compartment 120 and control compartment 172. In one embodiment, the extent of the increase in volume is equal to the volume of the expansion of the hydraulic fluid in control compartment 172 and the volume needed to expand pressure compartment 120 so that the heated gas therein is maintained at a constant pressure for a given position of piston rod 18. These relative movements of barrier 105 and temperature compensator 150 are illustrated by the contrast between FIGS. 1 and 2 which show piston rod 18 being moved between the retracted and compressed positions when damper 10 is in a cold state and FIGS. 3 and 4 which show piston rod 18 being moved between the retracted and compressed positions when damper 10 is in a heated As the hydraulic fluid in control compartment 172 is cooled, the hydraulic fluid in regulating compartment 160 is also cooled. Cooling of the hydraulic fluid causes the hydraulic fluid to contract within regulating compartment 160, thereby automatically moving temperature compensator 150 back to the original position. Accordingly, as a result of the movement of temperature compensator 150 based on the temperature of hydraulic fluid, the combined volume of pressure compartment 120 and control compartment 172 is automatically adjusted so as to regulate the pressure within compartments 120 and 172. The affect on the damping of damper 10 based on the temperature of the hydraulic fluid can thus be regulated. Another benefit of this embodiment of the invention is that the automatic adjustment regulating the pressure is done without the use of electricity, software, a computer processor, or other electronically controlled mechanisms.

It is appreciated that damper 10 need not be configured to maintain a constant pressure within control compartment 172 for a given position of piston rod 18 as the temperature of the hydraulic fluid within control compartment 172 changes. For example, by altering features such as the size of step 132 and/or other dimensions of temperature compensator 150 and/or stem 124, temperature compensator 150 can be configured to move so that for a given position of piston rod 18 the pressure within control compartment 172 still increases as the temperature increases but at a fraction or decreased rate relative to not having temperature compensator 150.

Furthermore, temperature compensator 150 can be designed to operate at a staggered delay relative to the change in temperature or only operate at select temperatures ranges. In addition, based on the initial positioning of temperature compensator 150 relative to shoulder 136, temperature compensator 150 can also be designed to work in reverse. That is, temperature compensator 150 can prevent a decrease in pressure within pressure compartment 120 and control compartment 172 as damper 10 moves from an assembled ambient state to a colder state.

Figure 5:
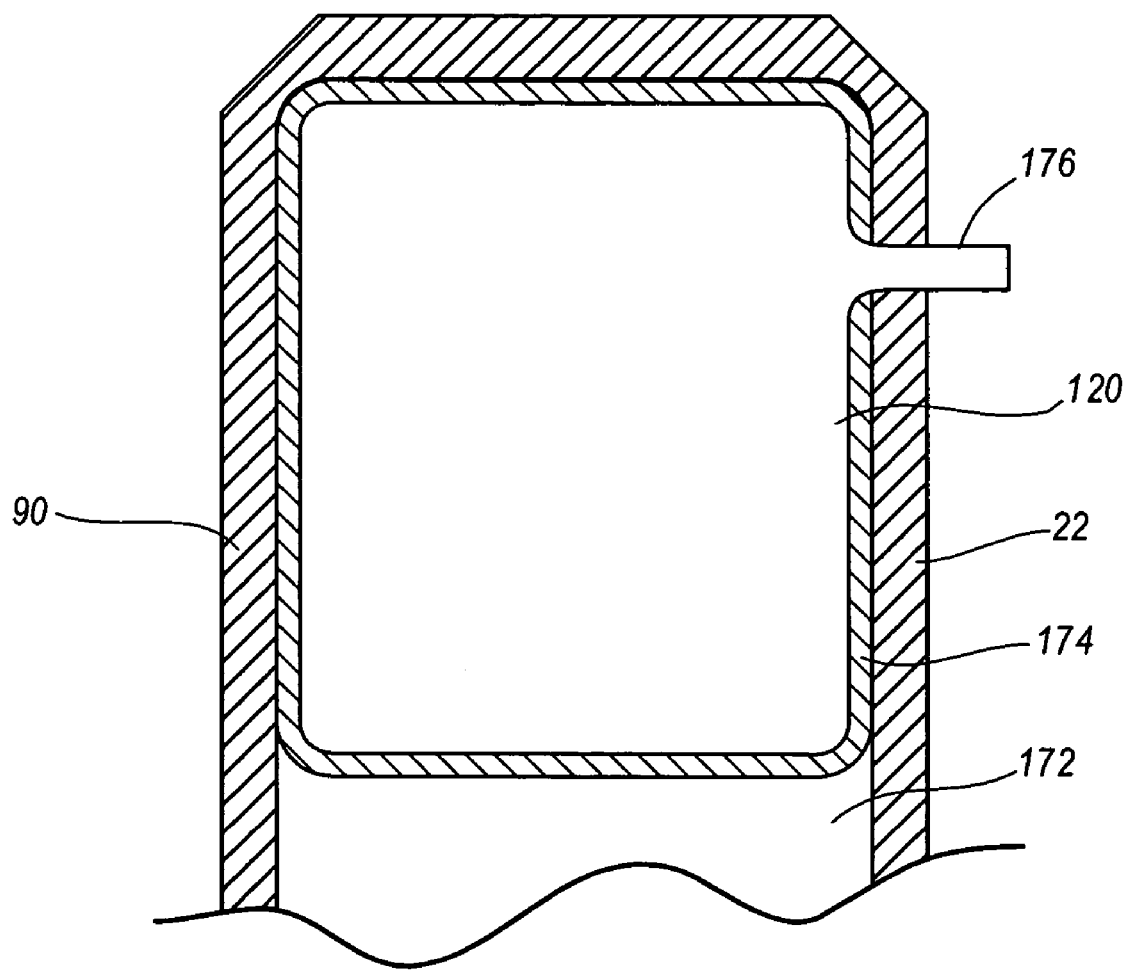
FIG. 5 is a cross sectional side view of an inflatable bladder replacing the floating piston depicted in FIG. 1.

The present invention envisions that damper 10 and the parts thereof can come in a variety of different designs and configurations. For example, in the embodiment discussed above in FIGS. 1–4, barrier 106 comprises a floating piston. In alternative embodiments, the floating piston can be replaced with a variety of alternative structures which provide a seal between pressure compartment 120 and control compartment 172 but which are also at least partially moveable so as to allow for expansion and contraction of pressure compartment 120 based on applied pressures. By way of example and not by limitation, depicted in FIG. 5 is a barrier which comprises an inflatable bladder 174.

Bladder 174 is disposed within secondary chamber 23 of secondary housing 22. Bladder 174 has an interior surface which bounds pressure compartment 120. A stem 176 projects through sidewall 90 of secondary housing 22 and communicates with pressure compartment 120. A gas valve is coupled with stem 176 to selectively inflate bladder 174. It is appreciated that bladder 174 can be comprised of a resiliently flexible material, such as an elastomeric material, which enables stretched expansion of bladder 174. Alternatively, bladder 174 can be comprised of flexible static material which can be inflated and compressed but not significantly stretched. During operation, pressures applied to bladder 174 causes bladder 174 to expand or contact so as to adjust the volume of pressure compartment 120.

It is appreciated that bladders come in a variety of different designs and configures and can be used with our without related pistons that bias against the bladder. Examples of typical commercial bladders that can be used include the Reservoir, Shock Absorber, Part #: 43078-1112, of the Kawasaki KX100C-1 Motorcycle Damper and Reservoir, Shock Absorber, Part #: 43078-1094, of the Kawasaki KX250N-1 Motorcycle Damper.

Figure 6:
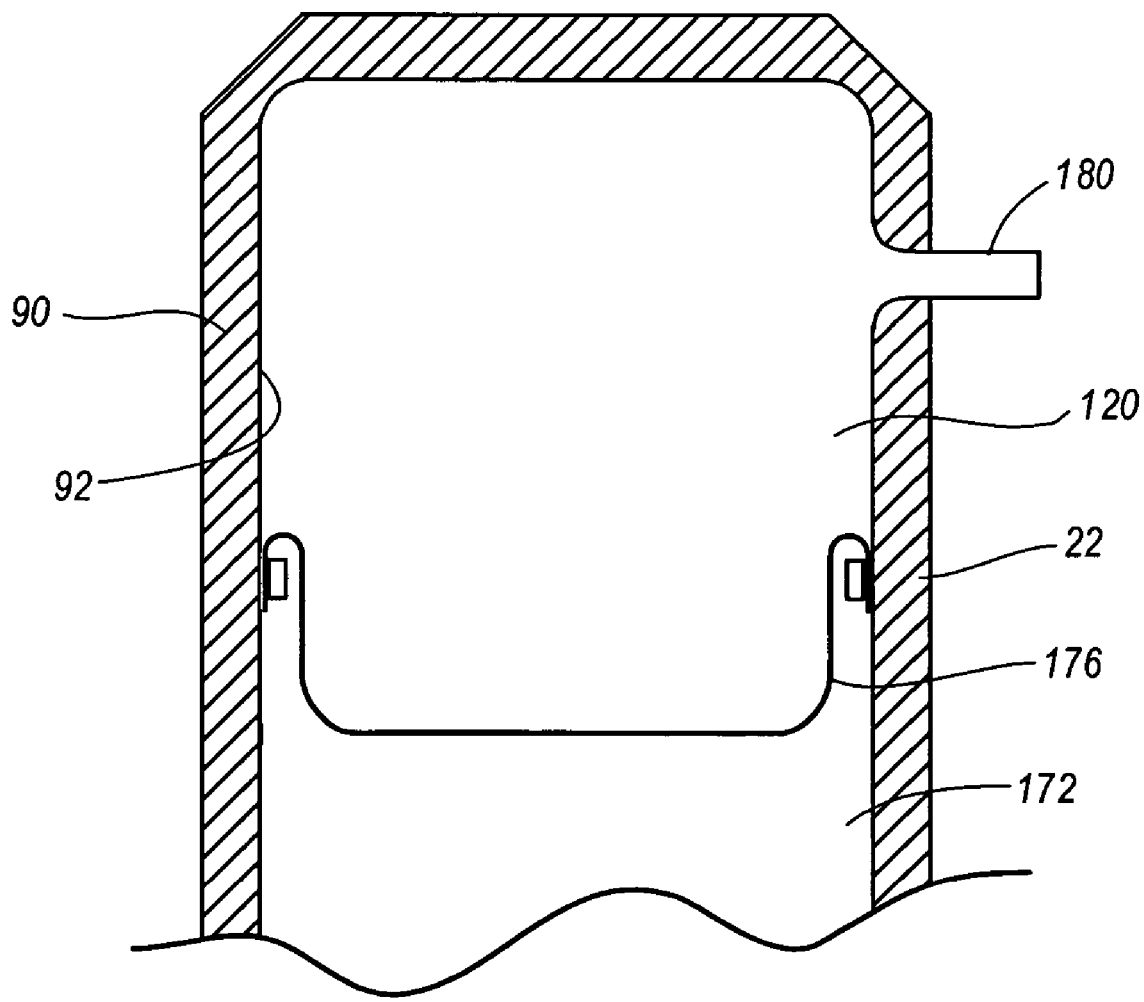
FIG. 6 is a cross sectional side view of a flexible diaphragm replacing the floating piston depicted in FIG. 1.

Depicted in FIG. 6 is another alternative embodiment of a barrier which comprises a flexible diaphragm 178. Diaphragm 178 is mounted on interior surface 92 of secondary housing 22 so as to separate pressure compartment 120 from control compartment 172. A stem 180 is mounted on sidewall 90 and bounds a passage that communicates with pressure compartment 120. A gas valve is disposed within the passage. As with bladder 174, diaphragm 178 can be comprised of a resiliently flexible material or a flexible static material. Pressures applied to diaphragm 178 move diaphragm 178 so as to adjust the volume of pressure compartment 120. It is appreciated that a variety of other structures can also be used to replace barrier 106 that perform the same function.

In one embodiment of the present invention, means are provided for automatically adjusting the combined volume of pressure compartment 120 and control compartment 172 based on the temperature of the hydraulic fluid within control compartment 172 so as to regulate the pressure within control compartment 172. By way of example and not by limitation, one example of such means comprises temperature compensator 150 interacting with stem 124. Alternative embodiments of such means are also depicted in FIGS. 7–11. It is appreciated that the like elements between damper 10 depicted in FIGS. 1–4 and the various dampers depicted in FIGS. 7–11 are identified by like reference characters.

Figure 7:
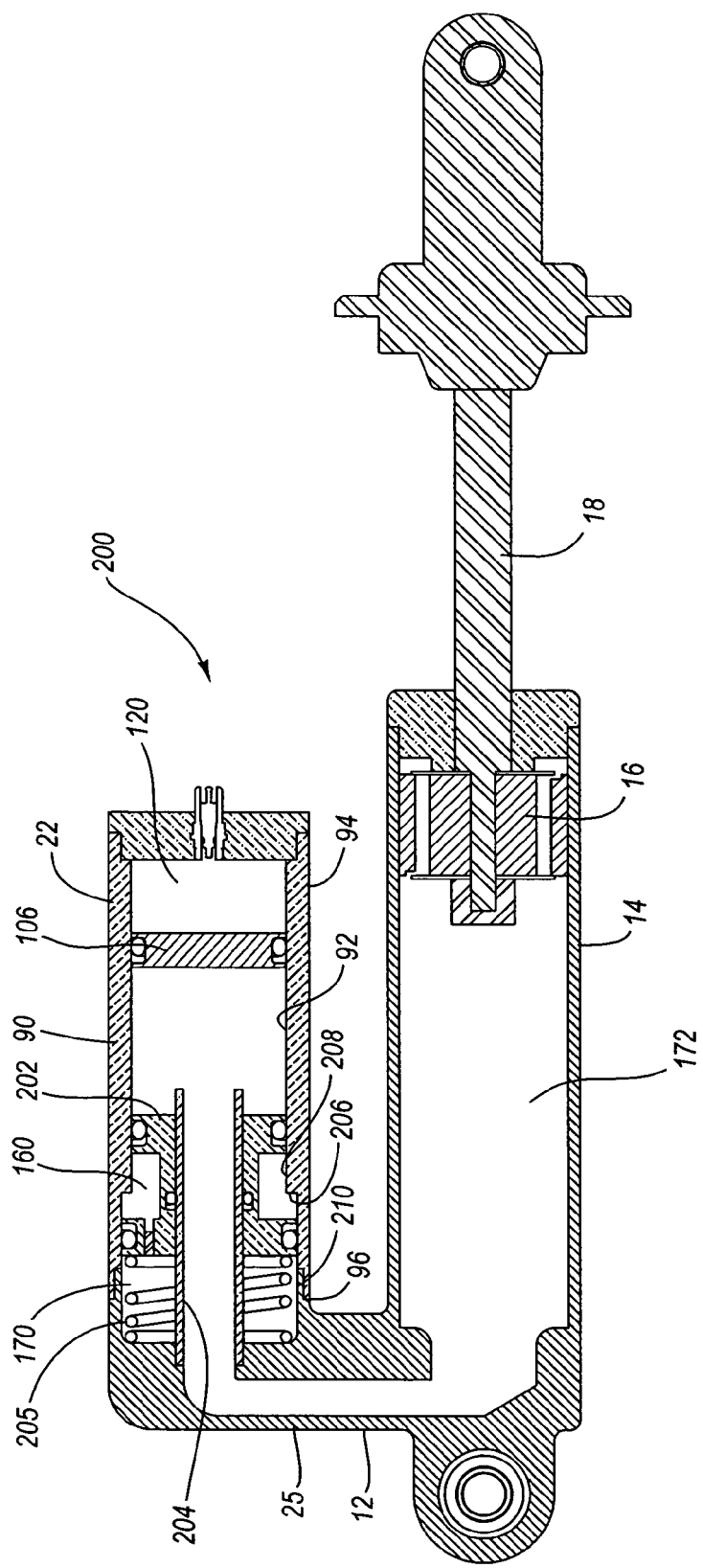
FIG. 7 is a cross sectional side view of an alternative embodiment a damper wherein the temperature compensator is inverted relative to the temperature compensator depicted in FIG. 1.

Depicted in FIG. 7 is an alternative embodiment of a damper 200 having a temperature compensator 202 encircling tubular stem 204. In this embodiment, temperature compensator 202 is distinguished over temperature compensator 150 in that temperature compensator 202 is inverted relative to temperature compensator 150. As such, regulating compartment 160 is bounded between temperature compensator 202 and sidewall 90 of secondary housing 22.

To facilitate adjustment in the volume of regulating compartment 160, interior surface 92 of sidewall 90 comprises an annular shoulder 206, an annular first portion 208 extending between shoulder 206 and first end 94 of secondary housing 22, and an annular second portion 210 extending between shoulder 206 and second end 96 of secondary housing 22. First portion 208 has an inside diameter smaller than the inside diameter of second portion 210. If desired, it is noted that stem 204 can be formed as an integral portion of housing 12.

Damper 200 is further distinguished over damper 10 in that the compressed gas in resistance chamber 170 has been replaced with a spring 205. Spring 205 is disposed within resistance compartment 170 so as to bias against temperature compensator 202. As used in the specification and appended claims, the term "spring" is broadly intended to include any structure or material capable of producing a resilient biasing force. For example spring 205 can comprise one or more coiled springs, a leaf springs, inflated bladders, sections of elastomeric material, or the like.

Figure 8:
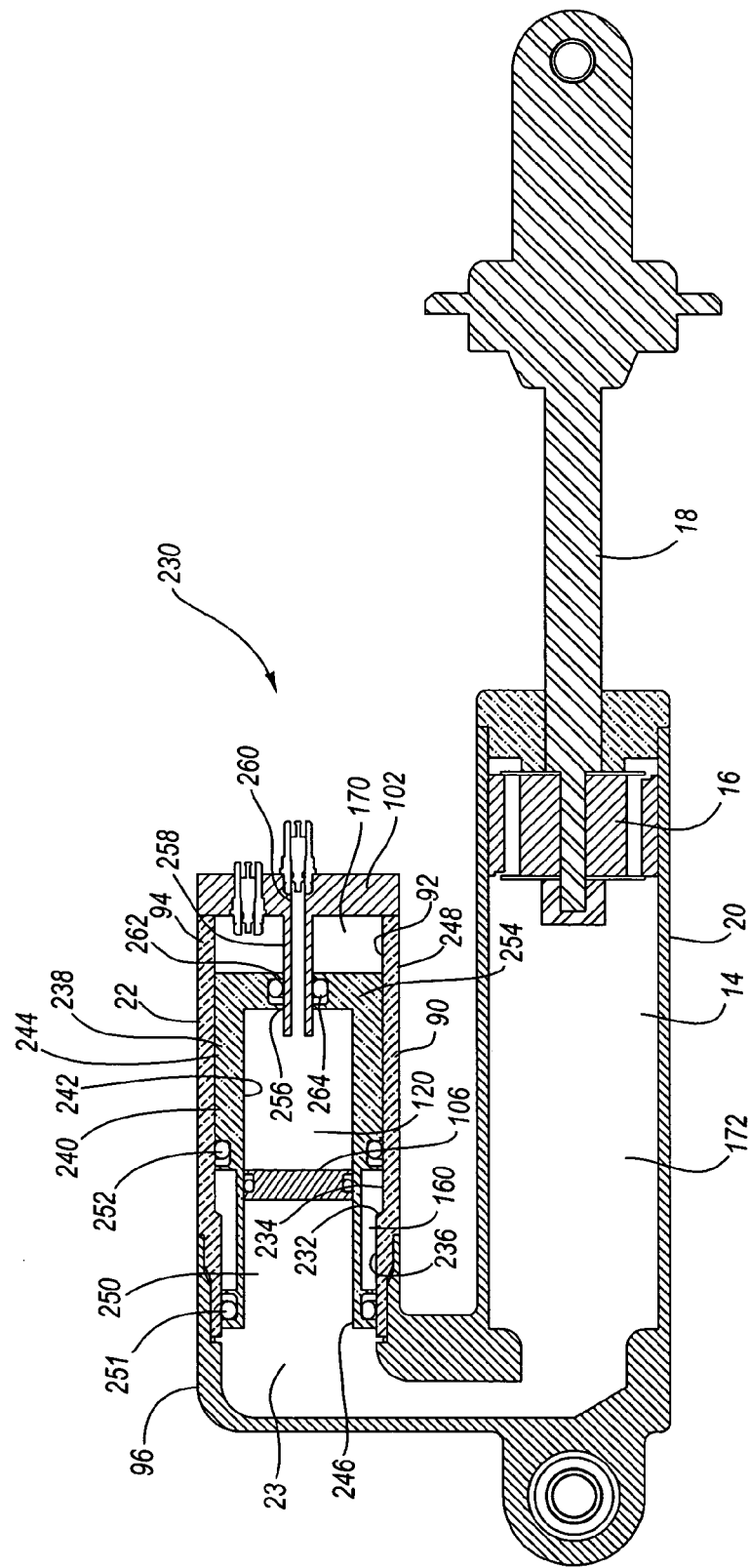
FIG. 8 is a cross sectional side view of another alternative embodiment a damper having a modified temperature compensator.

Depicted in FIG. 8 is another alternative embodiment of a damper 230 incorporating features of the present invention. In this embodiment, interior surface 92 of sidewall 90 of secondary housing 22 comprises an annular shoulder 232, an annular first portion 234 extending between shoulder 232 and first end 94 of secondary housing 22, and an annular second portion 234 extending between shoulder 232 and second end 96 of secondary housing 22. In this embodiment, first portion 234 has an inside diameter larger than the inside diameter of second portion 236.

A temperature compensator 238 is movably disposed within secondary chamber 23 of secondary housing 22. Temperature compensator 238 comprises a tubular sidewall 240 having an interior surface 242 and an exterior surface 244 extending between a first end 246 and an opposing second end 248. Interior surface 242 bounds a pocket 250. A first annular seal 251 and a spaced apart second annular seal 252 are mounted on exterior surface 244 of sidewall 240 so as to seal against second portion 236 and first portion 234, respectively, of sidewall 90 of secondary housing 22. Regulating compartment 160 is formed between seals 251 and 252 so as to encircle sidewall 240 of temperature compensator 238.

A floor 254 is formed at second end 248 of temperature compensator 238. A passage 256 extends through floor 254. A tube 258 has a first end 260 extending through cap 102 and a second end 262 extending through passage 256 on floor 254. A seal 264 is mounted on floor 254 and seals against tube 258 such that as temperature compensator 238 moves within secondary housing 22, tube 258 can slide in sealed engagement within passage 256.

Barrier 106 is movably disposed within pocket 250 of temperature compensator 238 and is sealed against interior surface 242 thereof. Pressure compartment 120 is bounded between barrier 106 and floor 254. Furthermore, resistance compartment 170 is bounded between floor 254 and cap 102. During use, as in the other embodiments, as the hydraulic fluid is heated within control compartment 172, the hydraulic fluid within regulating compartment 160 is also heated. In turn the expansion of the hydraulic fluid within regulating compartment 160 causes temperature compensator 238 to move toward first end 94 of secondary housing 22 so as to increase the volume of regulating compartment 160. As a result of the movement of regulating compartment 160, the combined volume of control compartment 172 and pressure compartment 120 is increased, thereby regulating the pressure within control compartment 172.

Figure 9:
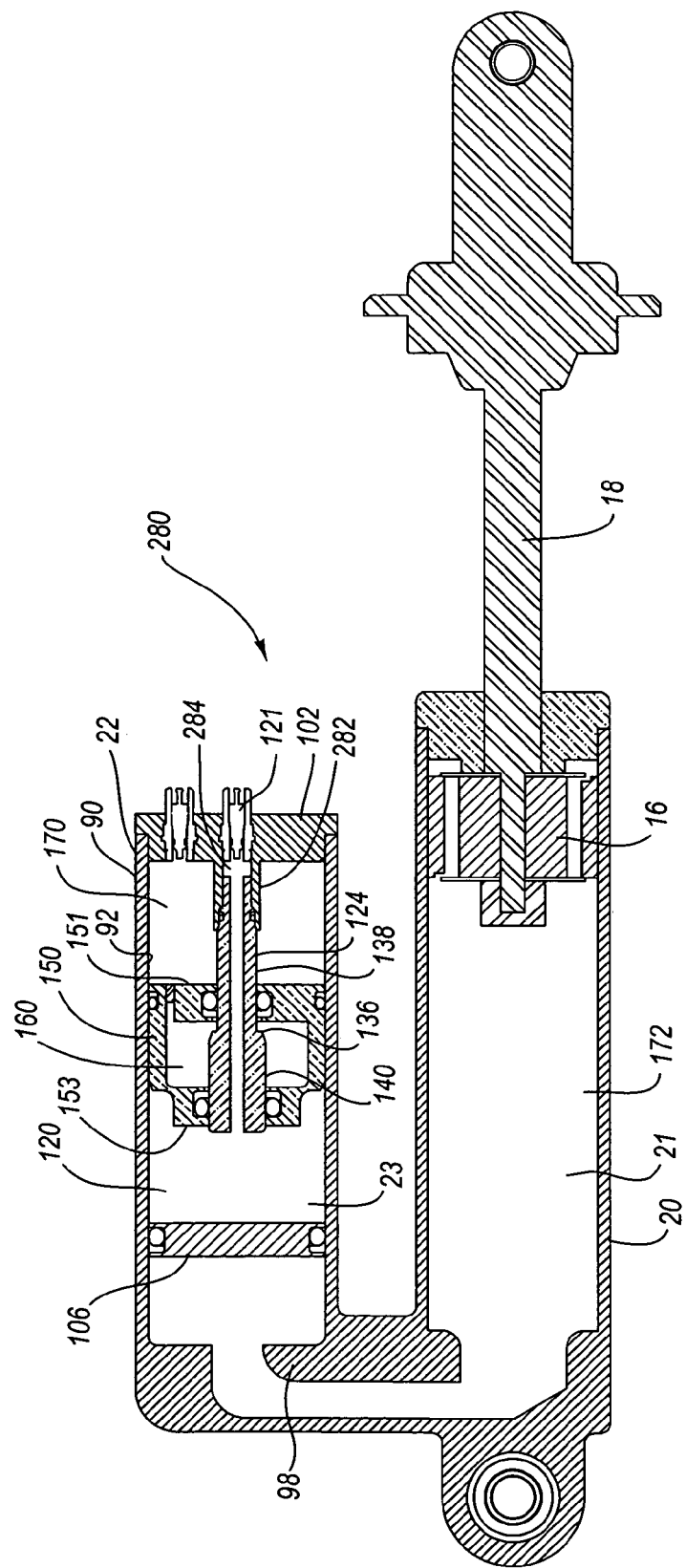
FIG. 9 is a cross sectional side view of another alternative embodiment a damper having a modified temperature compensator and related stem.

Depicted in FIG. 9 is another alternative embodiment of a damper 280 incorporating features of the present invention. Damper 280 comprises a tube 282 projecting from cap 102 into secondary housing 22. Tube 282 bounds a passage 284 which extends through tube 282 and cap 102. Gas valve 121 is connected to passage 284. Coupled in sealed engagement with tube 282 is stem 124 as previously discussed with regard to FIG. 2. Encircling stem 124 is temperature compensator 150 which was also previously discussed with regard to FIG. 2. Bound between temperature compensator 286 and stem 124 is regulating compartment 160. As previously discussed, movement of temperature compensator 286 along stem 124 varies the volume of regulating compartment 160.

Movably disposed within secondary chamber 23 of secondary housing 22 between temperature compensator 286 and end wall 98 is barrier 106. As such, primarily disposed between barrier 106 and second end face 153 of temperature compensator 150 is pressure compartment 120. Resistance compartment 170 is disposed between first end face 151 of temperature compensator 150 and cap 102. Once again, movement of temperature compensator 286, based on expansion of the heated hydraulic fluid within regulating compartment 160, results in increasing the combined volume of pressure compartment 120 and control compartment 172. As a result, the pressure within control compartment 172 is regulated based on the temperature of the hydraulic fluid. In one alternative, it is noted that barrier 106 in damper 280 can be positioned within primary chamber 21 of primary housing 20 rather than within secondary housing 22.

Figure 10:
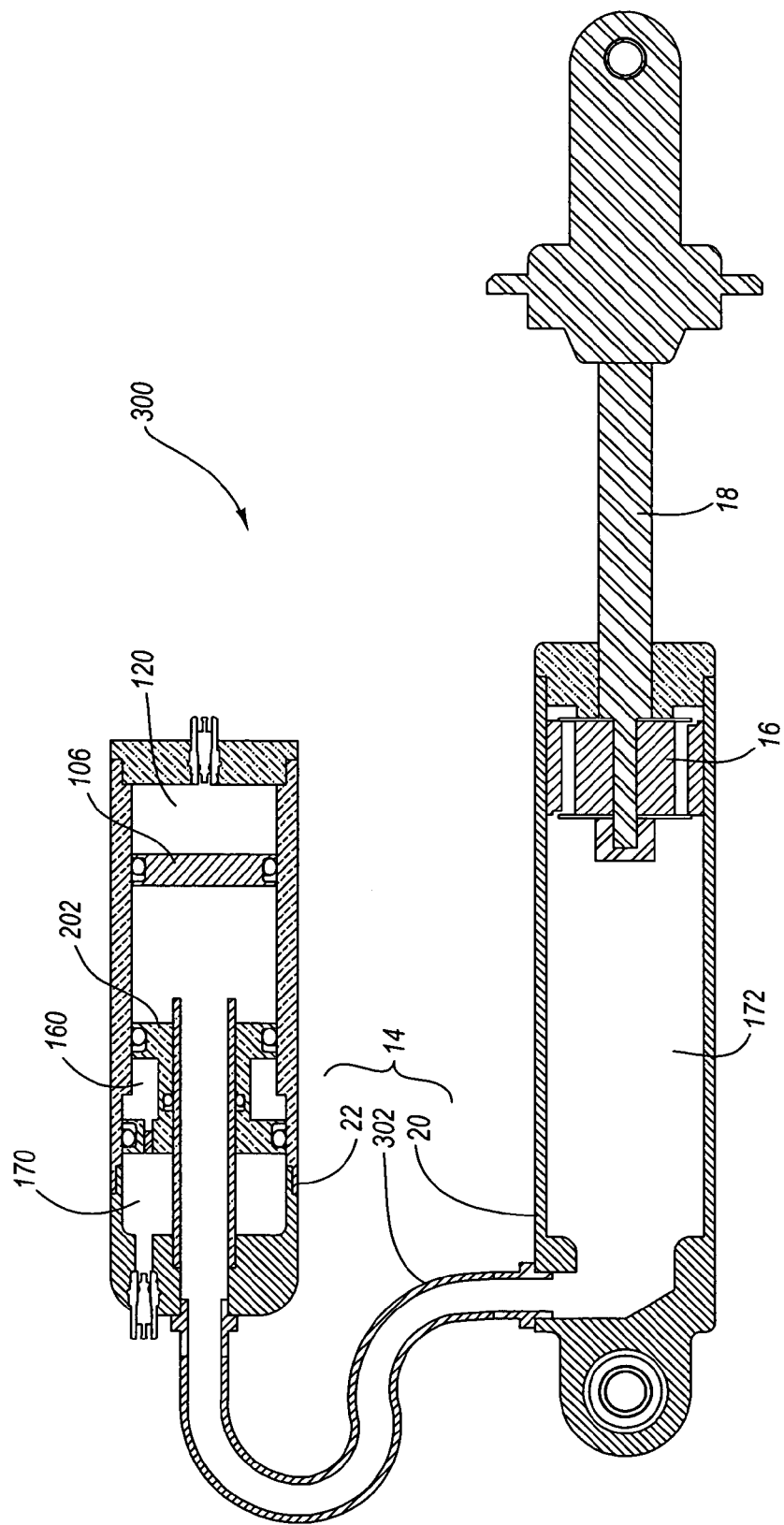
FIG. 10 is a cross sectional said view of another alternative embodiment a damper wherein a tube extends between the primary housing and a remote or secondary housing.

Depicted in FIG. 10 is still another alternative embodiment of a damper 300 incorporating features of the present invention. Damper 300 is substantially the same as damper 200 depicted in FIG. 7 except that the integrally formed transition housing 25 of damper 200 has been replaced with a tube 302 in damper 300. As such, housing 14 now comprises primary housing 20, secondary or remote housing 22, and tube 302. Tube 302 extends between primary housing 20 and secondary housing 22 so as to provide fluid communication between primary chamber 21 and secondary chamber 23. Tube 302 can be any desired length and can be flexible or rigid. As such, tube 302 can be comprised of a metal, polymeric material, composite or any other desired material. Tube 302 can also be comprised of one section or two or more discrete sections that are coupled together. Damper 300 operates in the same manner as previously discuss with regard to damper 200.

Figure 11:
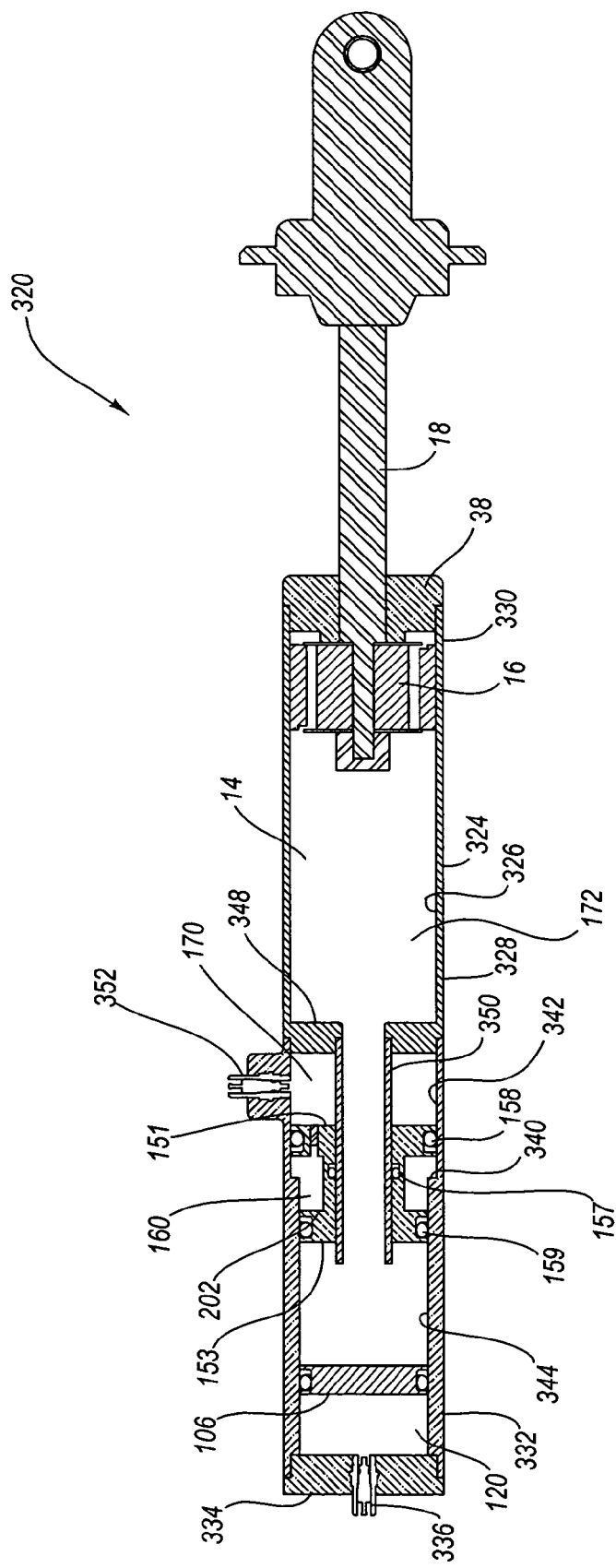
FIG. 11 is a cross sectional said view of yet another alternative embodiment a damper wherein the piggy-back depicted in FIG. 1 has been replaced with a monotube housing.

Depicted in FIG. 11 is yet another alternative embodiment of a damper 320 incorporating features of the present invention. In contrast to the previously described dampers which had a housing with a piggy-back configuration, damper 320 has a housing 322 having a monotube configuration. Specifically, housing 322 comprises a tubular sidewall 324 having an interior surface 326 and an exterior surface 328 extending between a first end 330 and an opposing second end 332. Interior surface 326 comprises an annular shoulder 340, and annular first portion 342 disposed between annular shoulder 340 and first end 330, and an annular second portion 344 disposed between shoulder 340 and second end 332. First portion 342 has a inside diameter that is larger than the inside diameter of second portion 344.

First end 330 of sidewall 324 is closed by cap 38 as discuss in FIG. 1. Piston rod 18 extends through cap 38 and is connected to piston 16. A cap 334 seals second end 332 of sidewall 324 closed. A gas valve 336 is mounted in a port extending through cap 334.

Radially inwardly projecting from first portion 342 of sidewall 324 is an annular brace 348. A tubular stem 350 is mounted on an inside edge of brace 348 and projects toward second end 332 of housing 322. Temperature compensator 202, as previously discussed with regard to FIG. 7, encircles stem 350. Annular seal 157 produces a sealed engagement between temperature compensator 202 and stem 350 while annular seals 158 and 159 produce sealed engagement between temperature compensator 202 and sidewall 324. Regulating compartment 160 is positioned between temperature compensator 202 and sidewall 324 so that shoulder 340 is disposed within regulating compartment 160.

Resistance compartment 170 also encircles stem 350 and is disposed between first end face 151 of temperature compensator 202 and brace 348. A gas valve 352 is mounted on sidewall 324 so as to communicate with resistance compartment 170. Movably disposed within chamber 14 between cap 334 and temperature compensator 202 is barrier 106. Pressure compartment 120 is bounded between barrier 106 and cap 334. The substantial remaining open area of chamber 14 comprises control chamber 172.

As with the other discussed embodiments, movement of temperature compensator 202, based on expansion of the heated hydraulic fluid within regulating compartment 160, results in increasing the combined volume of pressure compartment 120 and control compartment 172. As a result, the pressure within control compartment 172 is regulated based on the temperature of the hydraulic fluid. It is appreciated that the alternative temperature compensators as discussed with regard to the embodiments in FIGS. 7–9 can also be incorporated into the monotube housing depicted in FIG. 11.

The dampers of the present invention can be used independently or as part of a shock absorber, front fork, or other suspension system. Such dampers can be used in association with all types of vehicles or mechanical apparatus where it is desired to control suspension movement and/or vibration. Examples of vehicles on which the dampers can be used include bicycles, motorcycles, automobiles, all terrain vehicles, snowmobiles, airplanes, and the like.

The present invention may be embodied in other specific forms without departing from its spirit or essential characteristics. For example, it is appreciated that the various shoulders, temperature compensators, barriers and other related parts can be can be configured having a multiple of different contours, shapes, sizes, and interrelated placements. As such, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A damper comprising:
    a housing bounding a chamber, the chamber comprising a pressure compartment and a control compartment each having a volume;
    a barrier movably disposed within the chamber so as to separate the pressure compartment from the control compartment, the volume of the pressure compartment and the control compartment each being adjustable based on movement of the barrier;
    a first compressible gas disposed within the pressure compartment;
    a first hydraulic fluid disposed within the control compartment under a pressure, the first hydraulic fluid having a temperature;
    a piston shaft having a first end slidably disposed within the control compartment; and
    means for automatically adjusting the combined volume of the pressure compartment and the control compartment based on the temperature of the first hydraulic fluid within the control compartment so as to regulate the pressure within the control compartment, the means for automatically adjusting comprising a temperature compensator movably disposed within the chamber so as to communicate with the control compartment, the temperature compensator at least partially bounding a regulating compartment having an adjustable volume, a second hydraulic fluid being disposed within the regulating compartment, the temperature compensator being adapted to move under a force produced by expansion of the second hydraulic fluid when the second hydraulic fluid is heated within the regulating compartment.

2. A damper as recited in claim 1, wherein movement of the temperature compensator increases the combined volume of the pressure compartment and the control compartment.

3. A damper as recited in claim 1, wherein movement of the temperature compensator increases the volume of the regulating compartment.

4. A damper as recited in claim 1, further comprising:
a resistance compartment disposed within the chamber, the resistance compartment being separated from the control compartment by the temperature compensator; and
a spring or second compressible gas disposed within the resistance compartment so as to produce a resilient biasing force against the temperature compensator.

5. A damper as recited in claim 4, further comprising means for selectively putting a gas into or withdrawing a gas from the resistance compartment.

6. A damper as recited in claim 1, further comprising:
the housing comprising a tubular member having an exterior surface disposed within the chamber, an annular shoulder outwardly projecting from the exterior surface of the tubular member; and
the temperature compensator comprising an annular collar encircling the tubular member, the regulating compartment being sealed between the annular collar and the tubular member with the annular shoulder being disposed within the regulating compartment.

7. A damper as recited in claim 1, wherein the housing comprises an elongated tubular sidewall in which the barrier and the first end of the piston shaft are disposed.

8. A damper as recited in claim 1, wherein the housing comprises:
a primary housing in which the first end of the piston shaft is disposed; and
a secondary housing connected to the primary housing, the secondary housing being disposed horizontally adjacent to the primary housing, the barrier being disposed within the secondary housing.

9. A damper as recited in claim 1, wherein the housing comprises:
a primary housing in which the first end of the piston shaft is disposed; and
a remote housing; and
a tube extending in fluid communication between the primary housing and the remote housing.

10. A damper as recited in claim 1, wherein the barrier comprises a floating piston.

11. A damper as recited in claim 1, wherein the barrier prevents the transfer of fluids or gases between the pressure compartment and the control compartment but enables the transfer of a pressure between the pressure compartment and the control compartment.

12. A damper as recited in claim 1, further comprising means for selectively putting a gas into or withdrawing a gas from the pressure compartment.

13. A damper as recited in claim 1, further comprising a piston mounted on the first end of the piston shaft within the control compartment.

14. A damper comprising:
a housing bounding a chamber, the chamber comprising a pressure compartment and a control compartment each having a volume;
a barrier movably disposed within the chamber so as to separate the pressure compartment from the control compartment, the volume of the pressure compartment and the control compartment each being adjustable based on movement of the barrier, a compressible gas being disposed within the pressure compartment;
a temperature compensator movably disposed within the chamber, the temperature compensator at least partially bounding a regulating compartment that has a volume and is sealed from the pressure compartment and the control compartment, the volume of the regulating compartment and at least the control compartment or the pressure compartment each being adjustable based on movement of the temperature compensator, a first hydraulic fluid being disposed within the control compartment and a second hydraulic fluid being disposed within the regulating compartment, the temperature compensator being adapted to move under a force produced by expansion of the second hydraulic fluid when the second hydraulic fluid is heated within the regulating compartment; and
a piston shaft slidably disposed within the control compartment.

15. A damper as recited in claim 14, wherein the second hydraulic fluid within the regulating compartment is thermally coupled to the first hydraulic fluid within the control compartment such that heating of the first hydraulic fluid results in heating of the second hydraulic fluid.

16. A damper as recited in claim 14, wherein movement of the temperature compensator increases the combined volume of the pressure compartment and the control compartment.

17. A damper as recited in claim 14, wherein movement of the temperature compensator increases the volume of the regulating compartment.

18. A damper as recited in claim 14, wherein the chamber further comprises a resistance compartment, the resistance compartment being separated from the control compartment and the regulating compartment by the temperature compensator.

19. A damper as recited in claim 18, further comprising a spring or second compressible gas disposed within the resistance compartment so as to produce a resilient biasing force against the temperature compensator.

20. A damper as recited in claim 18, further comprising means for selectively putting a gas into or withdrawing a gas from the resistance compartment.

21. A damper as recited in claim 18, further comprising a second compressible gas disposed within the resistance compartment, the second compressible gas being under a pressure greater than the first compressible gas within the pressure compartment.

22. A damper as recited in claim 14, further comprising:
the housing comprising a tubular member having an exterior surface disposed within the chamber, an annular shoulder radially outwardly projecting from the exterior surface of the tubular member; and
the temperature compensator comprising an annular collar encircling the tubular member, the regulating compartment being sealed between the annular collar and the tubular member with the annular shoulder being disposed within the regulating compartment.

23. A damper as recited in claim 14, wherein the housing comprises an elongated tubular sidewall in which the barrier and the first end of the piston shaft are disposed.

24. A damper as recited in claim 14, wherein the housing comprises:

a primary housing in which the first end of the piston shaft is disposed; and a piggy-backed secondary housing connected to the primary housing, the barrier being disposed within the piggy-backed secondary housing.

25. A damper as recited in claim 14, wherein the housing comprises:
   a primary housing in which the piston shaft is disposed; and
   a remote housing; and
   a tube extending in fluid communication between the primary housing and the remote housing.

26. A damper as recited in claim 14, wherein the barrier comprises a floating piston.

27. A damper as recited in claim 14, wherein the barrier comprises an inflatable bladder or a flexible diaphragm.

28. A damper as recited in claim 14, wherein the barrier prevents the transfer of fluids or gases between the pressure compartment and the control compartment but enables the transfer of a pressure between the pressure compartment and the control compartment.

29. A damper as recited in claim 14, further comprising a gas valve mounted on the housing for selectively putting a gas into or withdrawing a gas from the pressure compartment.

30. A damper as recited in claim 14, further comprising a piston mounted on the piston shaft within the control compartment.

31. A damper comprising:
   a housing bounding a pressure compartment, a control compartment, and a regulating compartment each having a volume that is adjustable;
   a floating piston movably disposed between the pressure compartment and the control compartment, a first compressible gas being disposed within the pressure compartment and a first hydraulic fluid being disposed within the control compartment;
   a temperature compensator movably positioned between the regulating compartment and at least the control compartment or the pressure compartment, a second hydraulic fluid being disposed within the regulating compartment, the temperature compensator being adapted to move between at least:
   a first position that produces a first combined volume of the pressure compartment and the control compartment when the temperature of the second hydraulic fluid within the regulating compartment is at ambient conditions; and
   a second position that produces a second combined volume of the pressure compartment and the control compartment when the temperature of the second hydraulic fluid within the regulating compartment is raised above ambient conditions, the second combined volume being greater than the first combined volume; and
   a piston shaft having a first end slidably disposed within the control compartment.

* * * * *

UNITED STATES PATENT AND TRADEMARK OFFICE
CERTIFICATE OF CORRECTION

| | | |
|---|---|---|
| PATENT NO. | : 7,124,865 B2 | Page 1 of 4 |
| APPLICATION NO. | : 10/778975 | |
| DATED | : October 24, 2006 | |
| INVENTOR(S) | : Turner et al. | |

It is certified that error appears in the above-identified patent and that said Letters Patent is hereby corrected as shown below:

Drawings
Sheet 2, replace Figure 2 with the figure depicted herein below, in which the "passageway" has been labeled with --134--

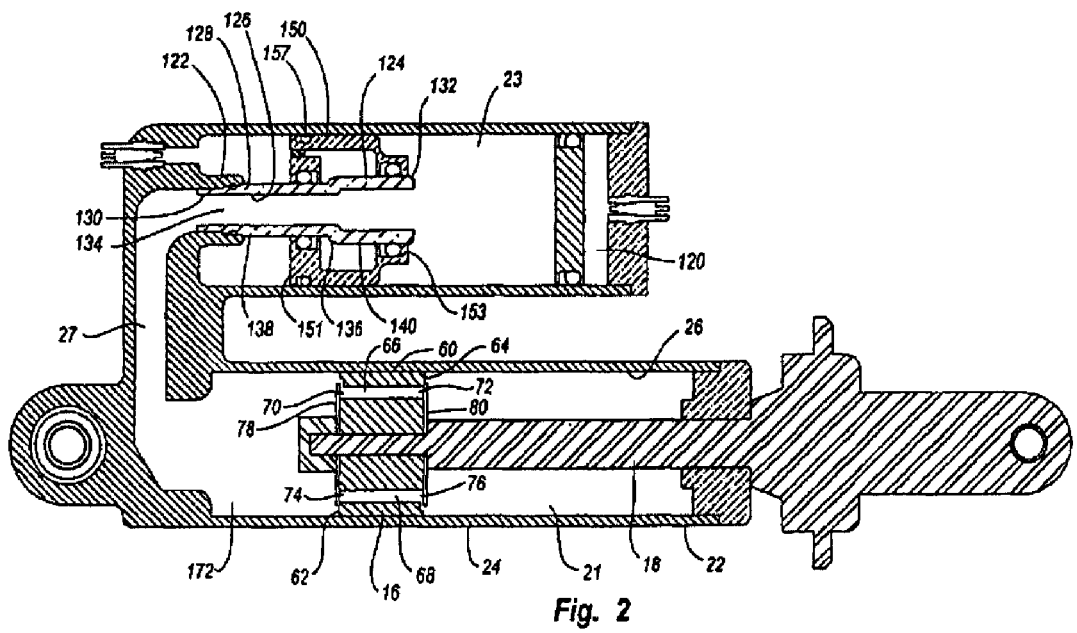

Fig. 2

UNITED STATES PATENT AND TRADEMARK OFFICE
CERTIFICATE OF CORRECTION

PATENT NO. : 7,124,865 B2  Page 2 of 4
APPLICATION NO. : 10/778975
DATED : October 24, 2006
INVENTOR(S) : Turner et al.

It is certified that error appears in the above-identified patent and that said Letters Patent is hereby corrected as shown below:

Drawings
Sheet 6, replace Figure 6 with the figure depicted herein below, in which the "diaphragm" previously labeled with "176" has been relabeled with --178--

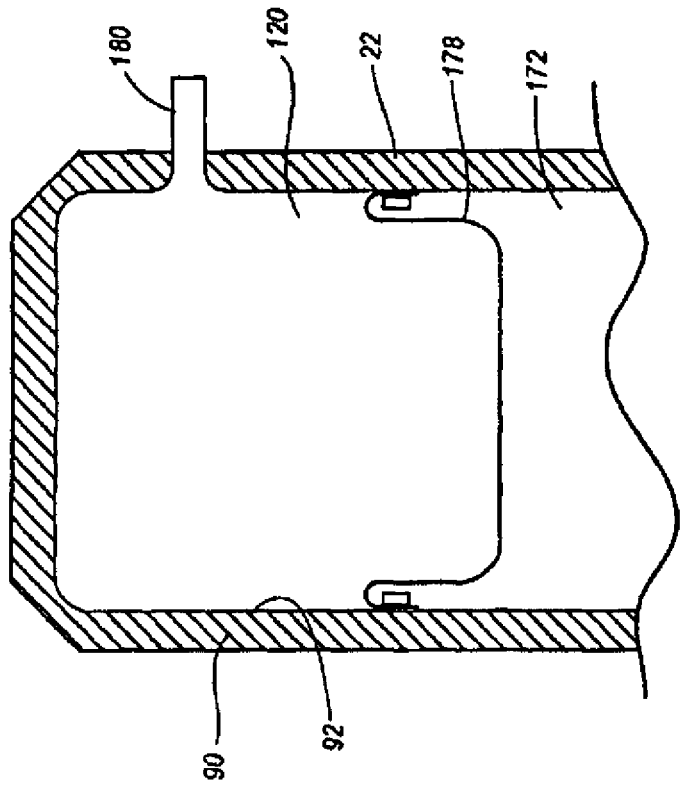

UNITED STATES PATENT AND TRADEMARK OFFICE
CERTIFICATE OF CORRECTION

| | |
|---|---|
| PATENT NO. | : 7,124,865 B2 |
| APPLICATION NO. | : 10/778975 |
| DATED | : October 24, 2006 |
| INVENTOR(S) | : Turner et al. |

It is certified that error appears in the above-identified patent and that said Letters Patent is hereby corrected as shown below:

Drawings
Sheet 11, replace Figure 11 with the figure depicted herein below, in which the "housing" has been labeled with --322--

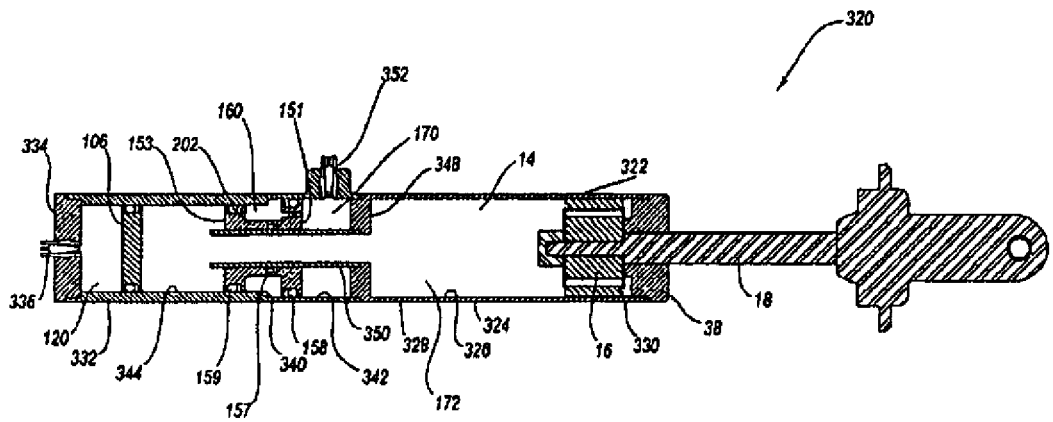

Fig. 11

Column 2
Line 28, after "embodiment" insert --of--

Column 3
Line 5, change "as" to --at--
Line 7, change "terminate" to --terminates--
Line 24, change "0-rings" to --O-rings--

Column 8
Line 34, change "step 132" to --the step--

Column 10
Line 64, change "286" to --150--
Line 66, change "286" to --150--

UNITED STATES PATENT AND TRADEMARK OFFICE
CERTIFICATE OF CORRECTION

PATENT NO. : 7,124,865 B2 Page 4 of 4
APPLICATION NO. : 10/778975
DATED : October 24, 2006
INVENTOR(S) : Turner et al.

It is certified that error appears in the above-identified patent and that said Letters Patent is hereby corrected as shown below:

Column 11
Line 2, change "286" to --150--
Line 8, change "286" to --150--

Column 15
Line 9, remove [and]

Signed and Sealed this

Seventh Day of July, 2009

JOHN DOLL
*Acting Director of the United States Patent and Trademark Office*